INVENTORS
LOUIS SEELBACH KRAFT
PAUL W. FREITAG, JR.
BY

*R. H. Hatton*
ATTORNEY

INVENTORS
LOUIS SEELBACH KRAFT
BY PAUL W. FREITAG, JR.

R. H. Hatton
ATTORNEY

United States Patent Office 3,422,947
Patented Jan. 21, 1969

3,422,947
CONVEYOR SYSTEM
Louis Seelbach Kraft, Stow, and Paul W. Freitag, Jr., Akron, Ohio, assignors to The Goodyear Tire & Rubber Company, Akron, Ohio, a corporation of Ohio
Filed Dec. 23, 1966, Ser. No. 604,254
U.S. Cl. 198—16           10 Claims
Int. Cl. B66b 9/12; B65g 15/42

ABSTRACT OF THE DISCLOSURE

A conveyor system including a flexible endless conveyor belt having a concave curve within its contour and means associated with the edge portions of the belt to maintain the desired concave curvature while retaining the belt transversely flat as it travels through this contour.

---

When a conveyor belt configuration comprises a first portion lying in one plane and a second portion lying in an inclined plane with respect to the first portion, the portion connecting the first and second portions has a concave curvature with the axis lying transversely of the belt.

Those skilled in the art are aware that the most common problem in a conveyor belt system of this type is to maintain the belt in engagement with the supporting surface in the area where the change in grade occurs as the natural tendency is for the belt to straighten thus lifting away from the supporting surface. Presently, in order to prevent the belt from lifting when a change in grade occurs, it is required that the natural radius of curvature of the belt be made quite large. For the purpose of this invention, the natural radius of curvature means the radius of curvature that the belt assumes when it is allowed to travel unrestrained with a first portion lying in one plane and a second portion lying in a plane at an angle with respect to the first portion. In this situation, the radius assumed to achieve the change in angle is quite large and is essentially that resulting from the sag of the belt caused by the unsupported weight of the belt section. This large natural radius of curvature has a distinct disadvantage when only a relatively short distance is to be negotiated.

In the moving walk passenger conveyor belt systems, because of this lifting tendency of the belt when relatively short distances have been involved, it has been necessary to design the belt without a concave curvature. Therefore, when moving passengers from one level to another, it has been necessary for the passengers to step directly from a fixed flat surface onto the slope of a moving inclined surface causing possible safety hazards and in addition, limiting the speed at which the belt can be operated.

Consequently, to solve this lifting problem, it is necessary to provide means such as wheels riding on the top surface of the belt along each edge thereof and transverse reinforcement within the belt such as steel cables to mechanically hold the intermediate concave curved portion transversely flat in such a manner that:

(A) Any imaginary transverse lines through the belt are substantially parallel in respect to any imaginary horizontal plane through the conveyor system, and (B) The concave radius of curvature of this intermediate portion is less than the natural radius curvature of the belt.

In the prior art, Australian Patent No. 153,807 discloses a flat conveyor belt system in which a plurality of wheels are located at opposite edge portions of the conveyor belt. However, the primary function of these wheels is to drive very long belts at uniform tension throughout the entire length thereof rather than to mechanically hold the belt transversely flat in the manner described above. It is also significant that the belt configuration shown in the Australian patent contains no concave curves and therefore does not involve the problem of the belt lifting when a change in grade occurs.

It is therefore an object of the present invention to provide an economical means to hold the intermediate concave curved portion of a conveyor belt transversely flat in such a manner that:

(A) Any imaginary transverse lines through the belt are substantially parallel in respect to any imaginary horizontal plane through the conveyor belt system, and (B) The radius of the concave curvature of this intermediate portion is less than the natural radius of curvature of the belt to provide an acceptable transition from the horizontal to the inclined surface of the moving belt.

Another object of this invention is to provide an economical means to prevent a conveyor belt from lifting off its supporting surface when transversing a short radius concave curve.

A further object of this invention is to provide a means to mechanically hold the concave curved portion of the belt transversely flat against the supporting surface without obstructing the top surface of the belt and interrupting the continuous flow of materials thereon.

A still further object of this invention is to permit passengers to more safely enter and exit from moving walk passenger conveyor belt systems by providing substantially horizontal portions at the exit and entrance ends of the belt.

An even further object of the present invention is to provide a moving walk passenger conveyor belt system which can be operated at increased speed when ascending or descending an inclined plane without danger to the passenger.

Other objects and advantages of this invention will become apparent hereinafter as the description thereof proceeds, the novel features, arrangements and combinations being clearly pointed out in the specification as well as the claims thereunto appended.

Figure 1:
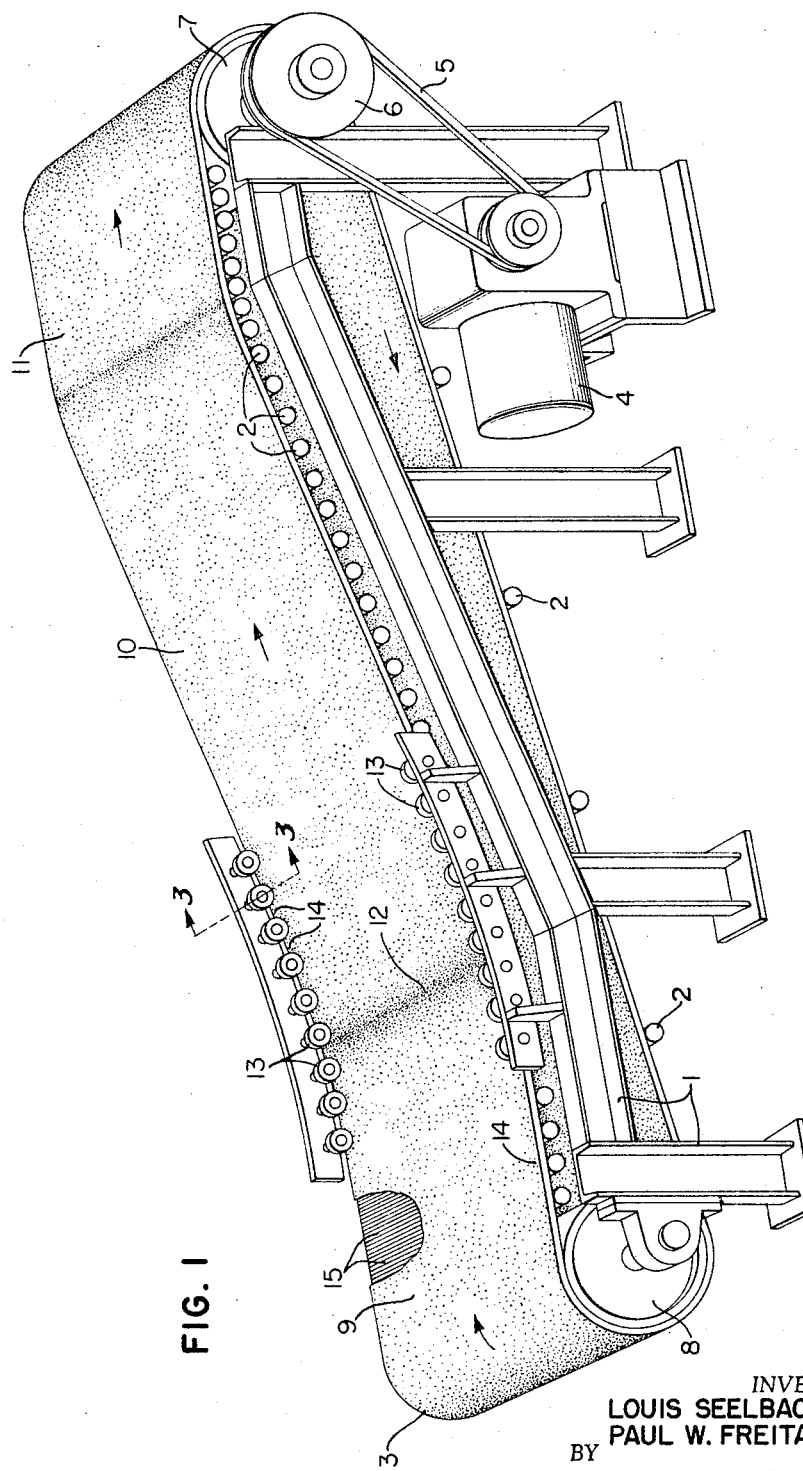
FIG. 1 is a perspective view of the conveyor belt system of this invention.

Referring now to FIG. 1 of the drawings which shows a conveyor belt system comprising a portion of a supporting frame assembly 1 with a plurality of rollers 2 mounted thereon supporting a flexible endless conveyor belt 3 composed of elastomeric material such as natural or synthetic rubber. For purposes of illustration, a motor 4 through belt 5 drives pulley 6 to move the belt 3 over the rollers 2 between the head pulley 7 and the tail pulley 8. The path of belt 3 has a configuration comprising a first portion 9 adjacent the tail pulley 8 moving in a substantially horizontal plane, a second portion 10 lying in an inclined plane with respect to the first portion 9, and a third portion 11 adjacent the head pulley 7 moving in a substantially horizontal plane. An intermediate portion 12 connects the first portion 9 and the second portion 10 and has a concave curvature, the axis of which lies transversely of the belt 3. A series of wheels 13 mounted on the supporting frame assembly 1 at the edges 14 of the intermediate portion 12 of the belt 3 and preferably the belt includes transverse steel cables 15 within to assist in maintaining belt 3 transversely flat across its width as diagrammatically illustrated in FIG. 2.

Figure 2:
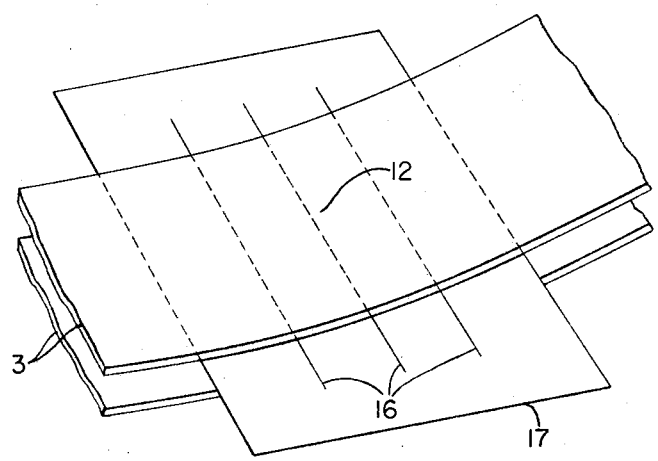
FIG. 2 is a diagrammatic fragmentary view of the belt shown in FIG. 1 to more clearly illustrate certain features of the invention.

FIG. 2 shows that the intermediate portion 12 of the belt 3 is held in such a manner that any imaginary transverse lines such as 16 through the belt 3 are substantially parallel to any imaginary plane such as 17 through the conveyor belt system. It is also apparent that when the belt is restrained in the manner described in FIG. 1, the radius of the concave curvature of the intermediate portion 12 will be less than the natural radius of curvature of the belt 3 when no restraint is applied thereto.

Figure 3:
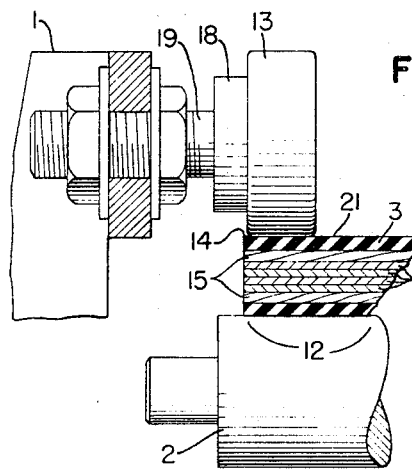
FIG. 3 is a section taken on 3—3 of FIG. 1 showing a portion of the invention.

The embodiment of this invention as seen in FIG. 3 shows one wheel 13 of the series of wheels 13 previously described in FIG. 1 which is rotatably mounted to the supporting frame assembly 1 adjacent to the edge 14 of the belt 3 by means of a bearing housing 18 and a shaft 19. The belt 3 as shown is made transversely rigid by means of internal reinforcement 15 such as steel cables and conventional reinforcing media 20 such as rayon, nylon or cotton. The wheel 13 engages the top surface 21 of the belt 3 at the edge 14 thereof to restrain the edge 14 of the belt 3 against lifting from roller 2. The steel cables 15 provide transverse rigidity and along with wheel 13 cooperates to prevent the belt 3 from moving laterally inward thus holding the intermediate portion 12 of the belt 3 transversely flat and against the rollers 2 in the manner described in FIG. 2. As a result, any imaginary transverse lines 16 through the belt 3 are substantially parallel to any imaginary plane 17 through the conveyor belt system and the radius of curvature of the intermediate portion 12 is less than the natural radius of curvature of the belt 3.

Figure 4:
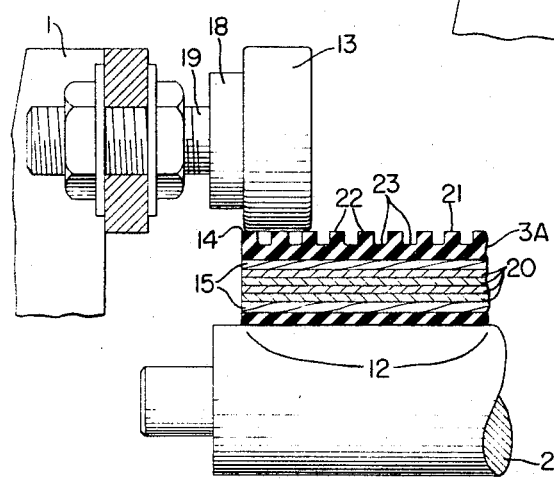
FIG. 4 illustrates a modification of the invention shown in FIG. 3.

FIG. 4 is a modification in which the top surface 21 of the belt 3A has a plurality of longitudinal ribs 22 and grooves 23 formed therein.

Figure 5:
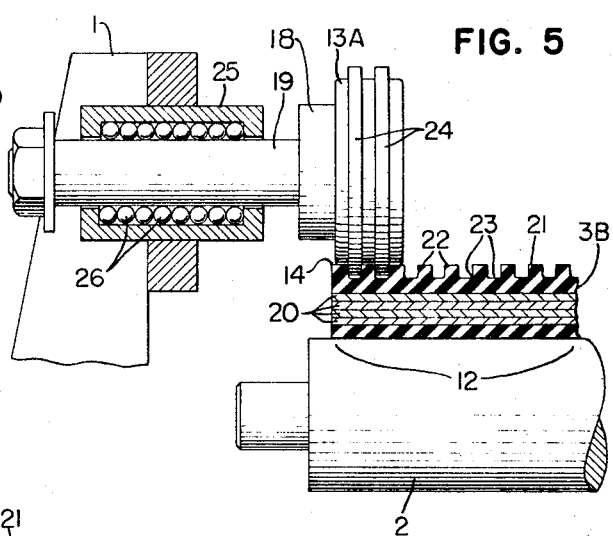
FIG. 5 illustrates still another modification of the invention shown in FIG. 3.

In the embodiment shown in FIG. 5, a wheel 13A having circumferential ribs 24 machined thereon is rotatably mounted on the supporting frame assembly 1 adjacent the edges 14 of the belt 3B in a manner similar to that shown in FIG. 4. The belt 3B is of conventinoal construction and includes in the top surface 21, a plurality of continuous longitudinal ribs 22 and grooves 23 formed therein. In this embodiment, the ribs 24 of wheel 13A engage grooves 23 to provide positive lateral restraint as well as radial restraint along the edge 14 of the belt 3B. The lateral restraint prevents the lateral inward movement of the belt to thus hold the intermediate portion 12 of the belt 3B transversely flat and the radial restraint retains the belt 3B against the supporting rollers 2 as previously described.

In FIG. 5 ball bushing 25 with balls 26 permit shaft 19 and wheel 13A to move laterally with respect to the supporting frame assembly 1 to compensate for the natural lateral movements of the belt 3B and maintain the ribs 24 of wheel 13A in proper engagement with grooves 23 along the edges 14 of belt 3B. Preferably wheel 13A and its counterpart on the opposite side of the belt 3B, not shown, are mounted so as to move simultaneously in a lateral direction to maintain a constant distance therebetween thus retaining the same lateral contour of the belt.

It should be understood that the belt may be composed of any of the materials well-known in the art and that longitudinal tensioning and transverse stiffening of the belt may be accomplished by any of the conventional materials commonly used for these purposes. There are also varieties of supporting structures available and the particular one used is largely a matter of choice. By way of example, the supporting surface may be a series of spaced rollers extending the entire width of the belt, a plurality of spaced rollers located at various points under the belt surface, a series of rollers at each edge portion of the belt, or even a slider bed upon which the belt travels. In some instances, for example with a particularly transversely rigid belt, the supporting surface under the concave portion could be eliminated as the belt itself would retain the desired contour.

While certain representative embodiments and details have been shown for the purpose of illustrating the invention, it will be apparent to those skilled in the art that various changes and modifications may be made therein without departing from the spirit or scope of the invention.

We claim:
1. A belt conveyor system comprising:
(A) a frame assembly;
(B) supporting means mounted on said frame assembly;
(C) a flexible endless conveyor belt of elastomeric-like material having a plurality of grooves extending longitudinally thereof in at least a portion of the top surface of the belt with at least the underside of the edge portion thereof engaging said supporting means, the path of travel of said belt including,
  (1) a first portion lying in one plane,
  (2) a second portion lying at a plane inclined with respect to the first portion, and
  (3) an intermediate portion connecting the first and second portions, said intermediate portion having a concave curvature, the axis of which lies transverse to the belt;
(D) a plurality of wheels rotatably mounted on the frame assembly at each edge of the belt, each of said wheels contacting the top surface of the belt adjacent the edge thereof, thereby holding the intermediate portion in such a manner that any imaginary transverse lines through said intermediate portion are substantially parallel to any imaginary horizontal plane through the conveyor belt system and the radius of the concave curvature of the intermediate portion is less than the natural radius of curvature of the belt; and
(E) means for driving the belt over the supporting means.

2. A belt conveyor system as claimed in claim 1 in which the belt is made transversely rigid by means of internal reinforcement.

3. A belt system as claimed in claim 2 in which each wheel includes at least one circumferential rib to engage the grooves on the belt surface which are in alignment with said rib.

4. A belt system as claimed in claim 1 in which each wheel includes at least one circumferential rib to engage the grooves on the belt surface which are in alignment with said rib.

5. A belt system as claimed in claim 4 in which each wheel also includes mounting means to permit lateral movement thereof with respect to the frame assembly to compensate for lateral movements of the belt.

6. A moving walk passenger conveyor system for transporting passengers thereon comprising:
(A) a frame assembly;
(B) supporting means mounted on said frame assembly;
(C) a flexible endless conveyor belt of elastomeric material having a plurality of longitudinally extending continuous grooves in spaced relation across the top surface thereof to provide a traction surface on which the pasengers stand with at least the underside of the edge portion of the belt engaging said supporting means, the path of travel of said belt including
  (1) a first portion lying in a substantially flat horizontal plane,
  (2) a second portion extending upwardly with respect to said first portion and lying in a plane inclined at an angle thereto,
  (3) a connecting portion between the first and second portions, said connecting portion having a concave curvature, the axis of which lies transverse to the belt, and (4) a third portion extending in a substantially flat horizontal plane from the opposite end of said inclined portion, said first, second, and third portions thereby allowing passengers to enter the conveyor system on a substantially flat surface, be moved to a higher level, and exit from the conveyor system on a substantially flat surface;

(D) a plurality of wheels rotatably mounted on the frame assembly at each edge of the belt, each of said wheels contacting the top surface of the belt adjacent the edge thereof thereby holding the intermediate portion in such a manner that any imaginary transverse lines through said intermediate portion are substantially parallel to any imaginary horizontal plane through the conveyor belt system and the radius of concave curvature of the connecting portion is less than the natural radius of curvature of the belt; and (E) means for driving the belt over the supporting means.

7. A moving walk passenger conveyor system as claimed in claim 6 in which the belt is made transversely rigid by means of internal reinforcement.

8. A moving walk passenger conveyor system as claimed in claim 7 in which each wheel includes a plurality of circumferential ribs to engage the grooves on the belt surface which are in alignment with said ribs.

9. A moving walk passenger conveyor system as claimed in claim 6 in which each wheel includes a plurality of circumferential ribs to engage the grooves on the belt surface which are in alignment with said ribs.

10. A moving walk passenger conveyor system as claimed in claim 9 in which each wheel also includes mounting means to permit lateral movement thereof with respect to the frame assembly to compensate for lateral movements of the belt.

References Cited

UNITED STATES PATENTS

| | | | |
|---|---|---|---|
| Re. 25,531 | 3/1964 | Fabula | 198—16 |
| 1,334,458 | 3/1920 | Johnson. | |
| 3,144,930 | 8/1964 | Michels | 198—193 |
| 3,327,839 | 6/1967 | Sigety | 198—193 |

RICHARD E. AEGERTER, *Primary Examiner.*

U.S. Cl. X.R.

104—25; 198—193

UNITED STATES PATENT OFFICE
CERTIFICATE OF CORRECTION

Patent No. 3,422,947                                                                     January 21, 1969

Louis Seelbach Kraft et al.

It is certified that error appears in the above identified patent and that said Letters Patent are hereby corrected as shown below:

Column 1, line 18, insert -- This invention relates to conveyor belt systems and in particular to a moving walk passenger conveyor belt which permits passengers to enter or leave the belt on a horizontal plane prior to ascending or descending an inclined plane. --.

Signed and sealed this 24th day of March 1970.

(SEAL)
Attest:

Edward M. Fletcher, Jr.                                  WILLIAM E. SCHUYLER, JR.
Attesting Officer                                                Commissioner of Patents